(12) United States Patent
Chen et al.

(10) Patent No.: US 9,796,874 B2
(45) Date of Patent: Oct. 24, 2017

(54) SUBSTRATE STRUCTURE, MANUFACTURING METHOD THEREOF, AND METHOD FOR MANUFACTURING AN ELECTRONIC DEVICE

(71) Applicant: Industrial Technology Research Institute, Hsinchu (TW)

(72) Inventors: Sheng-Wei Chen, Jinhu Township (TW); Sin-An Chen, Yuanlin Township (TW); Chuan-Hsu Fu, Gongguan Township (TW); Li-Ching Wang, Jhongli (TW); Yi-Ling Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 274 days.

(21) Appl. No.: 14/534,233

(22) Filed: Nov. 6, 2014

(65) Prior Publication Data
US 2015/0307732 A1 Oct. 29, 2015

(30) Foreign Application Priority Data
Apr. 23, 2014 (TW) .............. 103114627 A

(51) Int. Cl.
*C09D 133/14* (2006.01)
*C09D 133/06* (2006.01)

(52) U.S. Cl.
CPC ......... *C09D 133/14* (2013.01); *C09D 133/06* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 8,173,249 | B2 | 5/2012 | Leu et al. |
| 8,388,779 | B2 | 3/2013 | Liao et al. |
| 2010/0068483 | A1 | 3/2010 | Leu et al. |
| 2010/0143708 | A1 | 6/2010 | Liao et al. |
| 2010/0167031 | A1 | 7/2010 | Leu et al. |
| 2010/0267203 | A1 | 10/2010 | Chen et al. |
| 2012/0024722 | A1 | 2/2012 | Chen |
| 2012/0052214 | A1 | 3/2012 | Tsai et al. |
| 2012/0064278 | A1 | 3/2012 | Chen |
| 2012/0164408 | A1 | 6/2012 | Hwu et al. |
| 2012/0201961 | A1 | 8/2012 | Liao et al. |
| 2013/0071650 | A1 | 3/2013 | Liu et al. |
| 2013/0161864 | A1 | 6/2013 | Liang et al. |

FOREIGN PATENT DOCUMENTS

| | | |
|---|---|---|
| TW | 201313864 A | 4/2013 |
| TW | 201315297 A | 4/2013 |
| TW | I402012 B1 | 7/2013 |

OTHER PUBLICATIONS

Taiwanese Office Action for Taiwanese Application No. 103114627, dated Oct. 27, 2015.
Chen et al., "Reliability Improvement of Flexible AMOLED Based on Auxiliary Functional Film Technology", SID 2012 Digest, 2012, pp. 264-267.
Chida et al., "3.4-inch Flexible High-Resolution Full-Color Top-Emitting AMOLED Display", SID 2013 Digest, SID Symposium Digest of Technical Paper, 2013, pp. 196-198.
Fukui et al., "Full Color Flexible Top-emission AMOLED Display on Polyethylene Naphthalate (PEN) Foil with Metal Oxide TFTs Backplane", SID 2013 Digest, SID Symposium Digest of Technical Papers, vol. 44, Issue 1, Jun. 2013, pp. 203-206.
Ho et al., "A Novel Flexible AMOLED with Touch Based on Flexible Universal Plane for Display Technology", SID 11 Digest, SID Symposium Digest of Technical Paper, 2011, pp. 625-628.
Lee et al., "A Novel Approach to Make Flexible Active Matrix Displays", SID 10 Digest, SID Symposium Digest of Technical Paper, 2010, pp. 810-813.
O'Brien et al.,"14.7 Active Matrix PHOLED Displays on Temporary Bonded PEN Substrates with Low Temperature IGZO TFTs", SID 2013 Digest, SID Symposium Digest of Technical Papers, vol. 44, Issue 1, Jun. 2013, pp. 447-450.

*Primary Examiner* — Sheeba Ahmed
(74) *Attorney, Agent, or Firm* — Birch, Stewart, Kolasch & Birch, LLP

(57) ABSTRACT

According to embodiments of the disclosure, a substrate structure, a method for manufacturing the substrate structure, and a method for manufacturing an electronic device are disclosed. The substrate structure includes a carrier, a de-bonding layer, and a flexible substrate. The carrier has a top surface. The de-bonding layer contacts the carrier, wherein there is a first adhesion force between the de-bonding layer and the carrier. The de-bonding layer is prepared from a composition, and the composition includes at least one acrylate-based monomer and at least one acrylate-based oligomer, wherein the total number of acrylate groups in the acrylate-based monomer and the acrylate-based oligomer is greater than or equal to 3. The flexible substrate covers and contacts the de-bonding layer, wherein there is a second adhesion force between the de-bonding layer and the flexible substrate. The second adhesion force is greater than the first adhesion force.

22 Claims, 21 Drawing Sheets

SUBSTRATE STRUCTURE, MANUFACTURING METHOD THEREOF, AND METHOD FOR MANUFACTURING AN ELECTRONIC DEVICE

CROSS REFERENCE TO RELATED APPLICATION

The application is based on, and claims priority from, Taiwan Application Serial Number 103114627, filed on Apr. 23, 2014, the disclosure of which is hereby incorporated by reference herein in its entirety.

TECHNICAL FIELD

The disclosure relates to a substrate structure, a manufacturing method thereof, and a method for manufacturing an electronic device.

BACKGROUND

Current trends move toward light weight, slim profile, and even display on non-flat surfaces. Therefore, soft and flexible substrates are currently being developed.

The electronic device having a flexible substrate may be fabricated by a sheet-to-sheet process. One of the technical difficulties in the fabrication process is to efficiently separate the flexible substrate from a rigid carrier (such as a glass substrate) after the fabrication of elements of the electronic device. Furthermore, in the actual application of the electronic device having a flexible substrate, a hard coating layer should be formed on the flexible substrate to protect the flexible electronic device and extending the lifetime.

SUMMARY

An embodiment of the disclosure provides a substrate structure, including a carrier having a top surface; a de-bonding layer disposed on the top surface and in contact with the carrier; and a flexible substrate disposed on and contacted to the de-bonding layer. There is a first adhesion force between the de-bonding layer and the carrier, there is a second adhesion force between the de-bonding layer and the flexible substrate, and the second adhesion force is greater than the first adhesion force. The de-bonding layer is prepared from a composition, and the composition includes: at least one acrylate monomer; and at least one acrylate-based oligomer, wherein the total number of acrylate groups in the acrylate-based monomer and the acrylate-based oligomer is greater than or equal to 3.

According to another embodiment of the disclosure, a method for manufacturing a substrate structure is provided. The method includes: providing a carrier, wherein the carrier has a top surface; applying a composition on the top surface of the carrier to form a coating, and subjecting the coating to a curing process to form a de-bonding layer; and providing a flexible substrate to cover and contact to the de-bonding layer, wherein there is a first adhesion force between the de-bonding layer and the carrier, there is a second adhesion force between the de-bonding layer and the flexible substrate, and the second adhesion force is greater than the first adhesion force. The composition includes: at least one acrylate monomer; and at least one acrylate-based oligomer, wherein the total number of acrylate groups in the acrylate-based monomer and the acrylate-based oligomer is greater than or equal to 3.

Some embodiments of the disclosure provide a method for manufacturing an electronic device, including: providing a carrier, wherein the carrier has a top surface; applying a composition on the top surface of the carrier to form a coating, and subjecting the coating to a curing process to form a de-bonding layer, wherein there is a first adhesion force between the de-bonding layer and the carrier; providing a flexible substrate to cover and contact the de-bonding layer, wherein there is a second adhesion force between the de-bonding layer and the flexible substrate, and the second adhesion force is greater than the first adhesion force; forming at least one electric element on the flexible substrate; and performing a de-bonding process to separate the de-bonding layer from the carrier. The composition includes: at least one acrylate monomer; and at least one acrylate-based oligomer, wherein the total number of acrylate groups in the acrylate-based monomer and the acrylate-based oligomer is greater than or equal to 3.

Some embodiments of the disclosure provide a substrate structure, comprising: a carrier having a top surface; a de-bonding layer disposed on the top surface, wherein the de-bonding layer is prepared from a composition, and the composition comprises: at least one acrylate monomer; and at least one acrylate-based oligomer, wherein the total number of acrylate groups in the acrylate-based monomer and the acrylate-based oligomer is greater than or equal to 3; and a flexible substrate disposed on the de-bonding layer; and a first functional layer disposed between the carrier and the de-bonding layer, or between the de-bonding layer and the flexible substrate; wherein, there is a fourth adhesion force between the first functional layer and the carrier, there is a fifth adhesion force between the de-bonding layer and the first functional layer, and the fifth adhesion force is greater than the fourth adhesion force when the first functional layer is disposed between the carrier and the de-bonding layer; or there is a first adhesion force between the de-bonding layer and the carrier, there is a fifth adhesion force between the de-bonding layer and the first functional layer, and the fifth adhesion force is greater than the first adhesion force when the first functional layer is disposed between the flexible substrate and the de-bonding layer.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
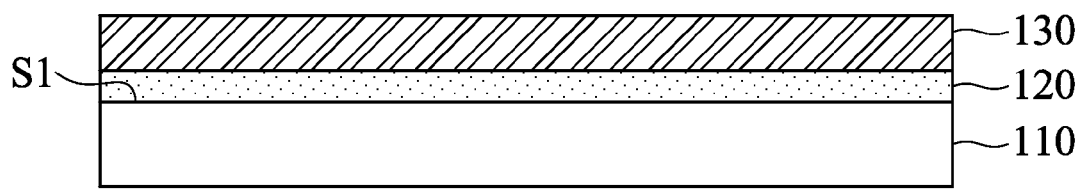
FIG. 1A shows a cross section of a substrate structure according to an embodiment of the disclosure.
Figure 1B:
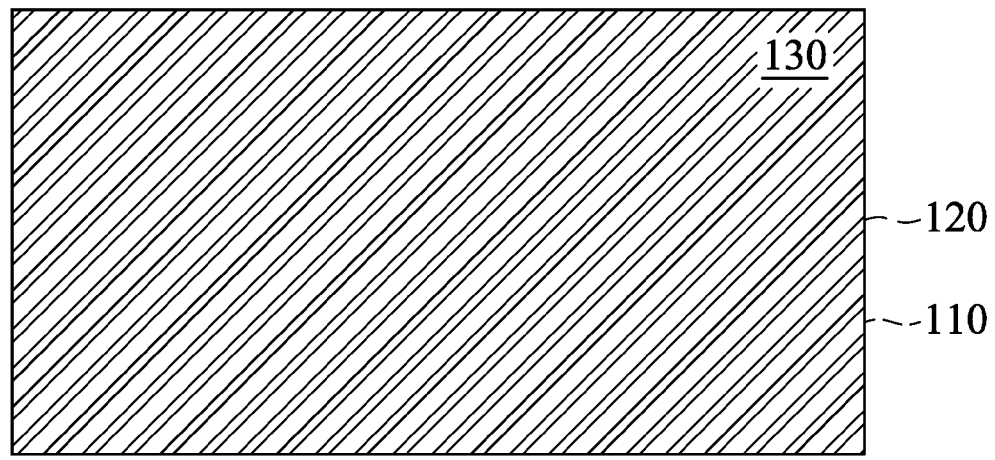
FIG. 1B shows a top view of the substrate structure as shown in FIG. 1A.

FIG. 1A shows a cross section of a substrate structure according to an embodiment of the disclosure, and FIG. 1B shows a top view of the substrate structure as shown in FIG. 1A.

As shown in FIGS. 1A and 1B, the substrate structure 100 according to an embodiment of the disclosure includes a carrier 110, a de-bonding layer 120, and a flexible substrate 130. The carrier 110 may have a top surface S1, wherein the carrier 110 may include a glass substrate, a semiconductor substrate, a metal substrate, a plastic substrate, or a ceramic substrate. The de-bonding layer 120 may be disposed on the top surface S1 and contact to the carrier 110. There is a first adhesion force between the de-bonding layer 120 and the carrier 110, wherein the first adhesion force may be between 0-1 B, such as 0 B. The de-bonding layer 120 may be prepared from a composition, and the composition may include at least one acrylate monomer and at least one acrylate-based oligomer. Since the sum of the acrylate groups of the acrylate-based monomer and the acrylate-based oligomer may be greater than or equal to 3, the de-bonding layer 120 would have hardness to serve as a hard coating layer, thereby protecting the subsequently formed flexible substrate 130.

The de-bonding layer 120 may have a pencil hardness greater than or equal to 1H. The flexible substrate 130 may cover and contact to the de-bonding layer 120, wherein the flexible substrate 130 may include polyimide (PI), polycarbonate (PC), polyethersulfone (PES), polyacrylate (PA), polynorbornene (PNB), polyethylene terephthalate (PET), polyetheretherketone (PEEK), polyethylene naphthalate (PEN), or polyetherimide (PEI). There is a second adhesion force between the flexible substrate 130 and the de-bonding layer 120, wherein the second adhesion force may be between 2-5 B. Furthermore, the second adhesion force has to be greater than the first adhesion force in order to ensure that the de-bonding layer 120 is isolated from the top surface S1 of the carrier 110 when separating the flexible substrate 130 from the carrier 110 via a de-bonding process.

Figure 1C:
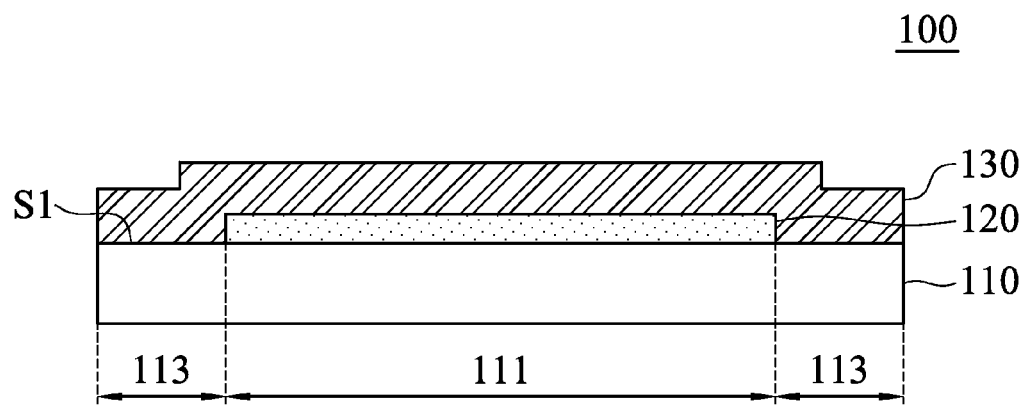
FIG. 1C shows a cross section of a substrate structure according to another embodiment of the disclosure.
Figure 1D:
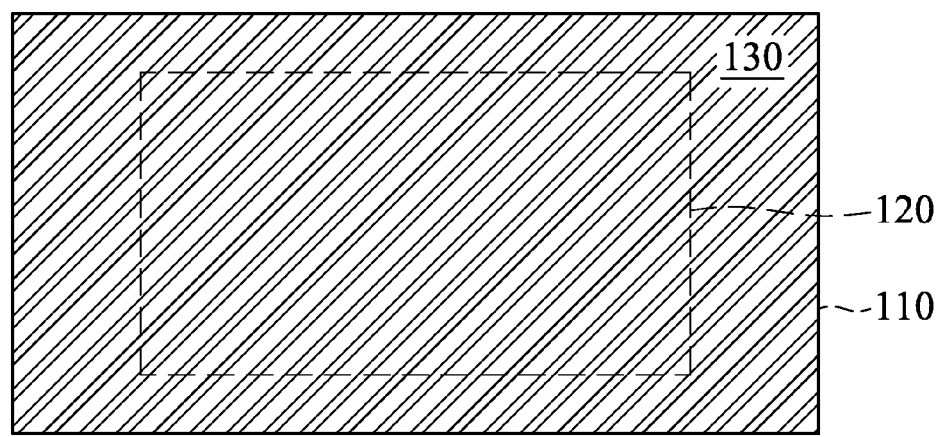
FIG. 1D shows a top view of the substrate structure as shown in FIG. 1C.

FIG. 1C shows a cross section of a substrate structure according to another embodiment of the disclosure, and FIG. 1D shows a top view of the substrate structure as shown in FIG. 1C.

As shown in FIGS. 1C and 1D, the substrate structure 100 includes a carrier 110, a de-bonding layer 120, and a flexible substrate 130. The carrier 110 may have a top surface S1, and the top surface S1 has a first region 111 and a second region 113. The de-bonding layer 120 is disposed on the first region 111 and contacts to the carrier 110. The flexible substrate 130 may prevent the de-bonding layer 120 from coming into contact with organic solvent. There is a first adhesion force between the de-bonding layer 120 and the carrier 110, wherein the first adhesion force may be between 0-1 B, such as 0 B. The de-bonding layer 120 may be prepared from a composition, and the composition may include at least one acrylate monomer and at least one acrylate-based oligomer. Since the total number of acrylate groups in the acrylate-based monomer and the acrylate-based oligomer may be greater than or equal to 3, the de-bonding layer 120 would have a hardness for serving as a hard coating layer, thereby protecting the flexible substrate 130. The de-bonding layer 120 may have a pencil hardness greater than or equal to 1H. The flexible substrate 130 may cover the de-bonding layer 120 and the second region 113 of the carrier 110, and the flexible substrate 130 may contact to the carrier 110 and the de-bonding layer 120. There is a second adhesion force between the flexible substrate 130 and the de-bonding layer 120, and there is a third adhesion force between the flexible substrate 130 and the carrier 110, wherein the second adhesion force and the third adhesion force may be between 2-5 B. Furthermore, the second adhesion force and the third adhesion force are greater than the first adhesion force.

Since the second adhesion force greater than the first adhesion force, the de-bonding layer 120 fixed on the flexible substrate 130 may be isolated from the top surface S1 of the carrier 110 easily when separating the flexible substrate 130 from the carrier 110 via a de-bonding process.

Since the third adhesion force greater than the first adhesion force, the process requirements may be achieved. For example, the flexible substrate 130 having the de-bonding layer 120 may be fixed on the carrier 110 due to the third adhesion force, resulting in preventing the de-bonding layer 120 from isolating from the carrier 110 before a subsequent de-bonding process.

Figure 1E:
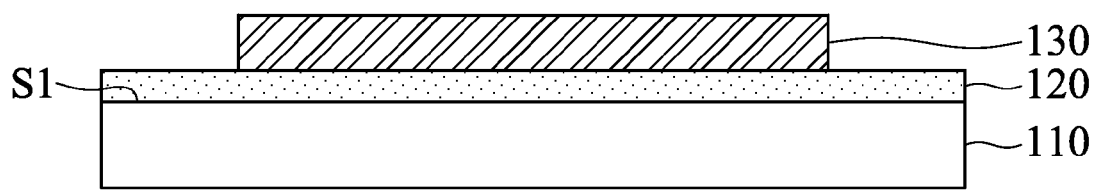
FIGS. 1E and 1F show cross sections of substrate structures according to some embodiments of the disclosure.
Figure 1F:
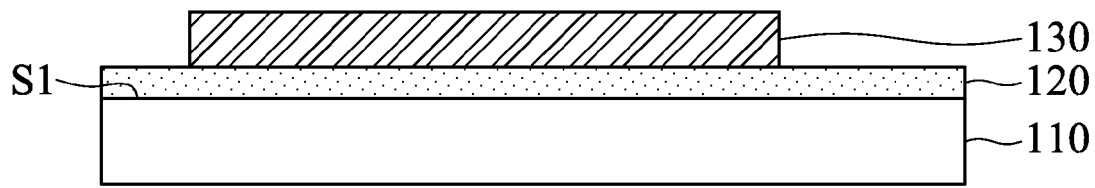

According to other embodiments of the disclosure, the flexible substrate 130 may be partially disposed on the de-bonding layer 120. Namely, the flexible substrate 130 does not completely cover the top surface of the de-bonding layer 120. The flexible substrate 130 may be disposed on a center area of the top surface of the de-bonding layer 120 (as shown in FIG. 1E). In another embodiment, the flexible substrate 130 may be disposed on the top surface of the de-bonding layer 120 and be closer to a first edge of the top surface than a second edge opposite to the first edge (as shown in FIG. 1F).

According to an embodiment of the disclosure, the acrylate monomer may have at least one of functional group (such as having 1-6 functional groups), the functional group may include acrylate group or methacrylate group. Furthermore, the acrylate monomer may have a molecular weight of between 100-1000 g/mol.

The monomer may be a monomer having an acrylate group or a methacrylate group. For example, the acrylate monomer may be methyl methacrylate, 2-phenoxy ethyl acrylate, ethoxylated 2-phenoxy ethyl acrylate, 2-(2-ethoxyethoxyl)ethyl acrylate, cyclic trimethylolpropane formal acrylate, β-carboxyethyl acrylate, lauryl acrylate, lauryl methacrylate, isooctyl acrylate, stearyl acrylate, isodecyl acrylate, stearyl methacrylate, isoborny acrylate, isoborny methacrylate, benzyl acrylate, phenoxy ethyl acrylate, ethoxylated phenoxy ethyl acrylate, trimethyl cyclohexane acrylate, 2-(2-Ethoxyethoxyl)ethyl acrylate, hydroxyethyl acrylate, 2-hydroxyethyl methacrylate, or a combination thereof.

The acrylate monomer may be a monomer having two function groups, the functional groups may include acrylate group or methacrylate group. For example, the acrylate monomer may be dioxane glycol diacrylate, hydroxypivalyl hydroxypivalate diacrylate, 1,6-hexanediol diacrylate, ethoxylated 1,6-hexanediol diacrylate, dipropylene glycol diacrylate, tripropylene glycol diacrylate, tricyclodecane dimethanol diacrylate, polyethylene glycol (200) diacrylate (having a molecular weight of 200), polyethylene glycol (400) diacrylate (having a molecular weight of 400), polyethylene glycol (600) diacrylate (having a molecular weight of 600), polyethylene glycol (200) dimethacrylate (having a molecular weight of 200), polyethylene glycol (400) dimethacrylate (having a molecular weight of 400), 2-hydroxyethyl methacrylate phosphate, neopentyl glycol diacrylate, propoxylated neopentyl glycol diacrylate, ethoxylated bisphenol-A diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, triethylene glycol dimethacrylate, diethylene glycol dimethacrylate, 1,4-butanediol diacrylate, 1,6-hexanediol dimethacrylate, allylated cyclohexyl dimethacrylate, or a combination thereof.

The acrylate monomer may be a monomer having three function groups, the functional groups may include acrylate group or methacrylate group. For example, the acrylate monomer may be tris(2-hydroxy ethyl)isocyanurate triacrylate, pentaerythritol triacrylate, ethoxylated trimethylolpropane triacrylate, ethoxylated trimethylolpropane trimethacrylate, propoxylated trimethylolpropane triacrylate, trimethylolpropane trimethacrylate, trimethylolpropane triacrylate, pentaerythritol triacrylate, ethoxylated pentaerythritol triacrylate, propoxylated glycerol triacrylate, propoxylated pentaerythritol triacrylate, or a combination thereof.

The acrylate monomer may be a monomer having four function groups, the functional groups may include acrylate group or methacrylate group. For example, the acrylate monomer may be pentaerythritol tetraacrylate, ethoxylated pentaerythritol tetraacrylate, propoxylated pentaerythritol tetraacrylate, trimethylolpropane tetraacrylate, dipentaerythritol hexaacrylate, or a combination thereof.

According to an embodiment of the disclosure, the acrylate-based oligomer may have at least two repeat units and have a molecular weight between 500-200000 g/mol. The acrylate-based oligomer may have at least one (such as 1-15) acrylate group or methacrylate group, such as polyester acrylate oligomer, epoxy acrylate oligomer, urethane acrylate oligomer, novolac epoxy acrylate oligomer, epoxidised soya bean oil acrylate oligomer, fatty acid modified polyester acrylate oligomer, aliphatic urethane acrylate oligomer, aromatic urethane acrylate oligomer, hyperbranched polyester acrylate oligomer, or a combination thereof.

For example, the polyester acrylate oligomer may have a structure represented by

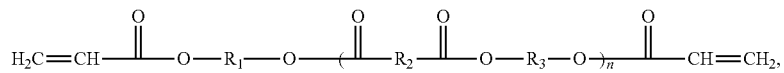

wherein $R_1$, and $R_3$ are independent linear or branched alkyl group (such as $C_{1-20}$ alkyl group); $R_2$ is divalent alkyl group (such as $-(CH_2)_X-$, and X is between 1-20), wherein n≥1.

The polyester acrylate oligomer may include polyester acrylate oligomers manufactured by Eternal Chemical Co., Ltd with trade Nos. 6311-100 (with six acrylate groups), 6312-100 (with six acrylate groups), 6312-100E (with six acrylate groups), 6313-100 (with four acrylate groups), 6314C-60, 6314C-60L, 6315, 6316, 6317, 6319, 6341, 6342, and 6320 (with four acrylate groups), 6323-100 (with six acrylate groups), 6327-100 (with two acrylate groups), 6332-100 (with two acrylate groups), 6361-100 (with eight acrylate groups), or 6362-100 (with 12-15 acrylate groups).

The polyester acrylate oligomer may include polyester acrylate oligomers manufactured by Double Bond Chemical Co., Ltd with trade Nos. 220 (with eight acrylate groups), 236, 245 (with six acrylate groups), 246, 257 (with four acrylate groups), 270 (with one acrylate group), 272 (with one acrylate group), 275 (with one acrylate group), 276 (with one acrylate group), 278 (with one acrylate group), 281 (with an average of 2.5 acrylate groups), 284 (with three acrylate groups), 285 (with four acrylate groups), 287 (with six acrylate groups), 2015 (with fifteen acrylate groups), or 2019 (with fifteen acrylate groups).

For example, the epoxy acrylate oligomer may have a structure of

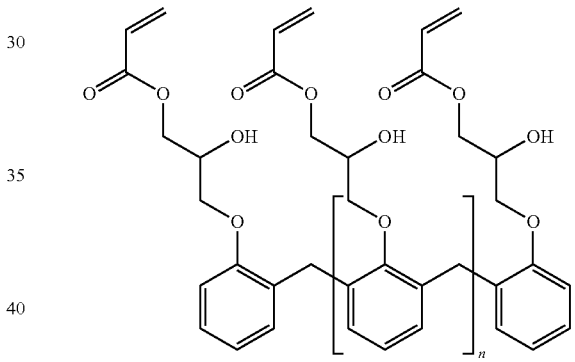

(wherein n may be 0, greater than or equal to 1).

The epoxy acrylate oligomer may include epoxy acrylate oligomers manufactured by Eternal Chemical Co., Ltd with trade Nos. 621-100 (with one acrylate group), 621-100 (with two acrylate groups), 621A-80 (with two acrylate groups), 6210G (with two acrylate groups), 6211-100 (with two acrylate groups), 6213-100 (with two acrylate groups), 6215-100 (with two acrylate groups), 6219-100 (with two acrylate groups), 622-100, 622A-80, 623-100 (with two acrylate groups), 623A-80 (with two acrylate groups), 6231A-80 (with two acrylate groups), 6233 (with two acrylate groups), 624-100 (with two acrylate groups), 624A-75 (with two acrylate groups), 6241-100, 625C-45 (with 3-4 acrylate groups), or 6261 (with three acrylate groups).

The epoxy acrylate oligomer may include epoxy acrylate oligomers manufactured by Double Bond Chemical Co., Ltd with trade Nos. 120 (with two acrylate groups), 127-100

(with two acrylate groups), 127-TP20 (with two acrylate groups), 128 (with two acrylate groups), 1283C (with two acrylate groups), 129 (with two acrylate groups), 156 (with two acrylate groups), 1636 (with three acrylate groups), 1701 (with two acrylate groups), 1702 (with two acrylate groups), 1703 (with two acrylate groups), 176-TF (with two acrylate groups), 186 (with three acrylate groups), 188 (with five acrylate groups), and 191 (with two acrylate groups).

For example, the urethane acrylate oligomer may have a structure represented by

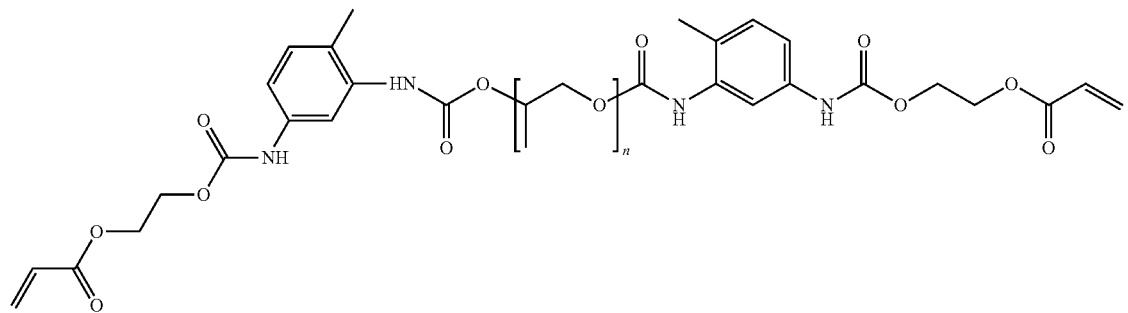

wherein n may be 0, greater than or equal to 1).

The urethane acrylate oligomer may include urethane acrylate oligomers manufactured by Eternal Chemical Co., Ltd with trade Nos. 6101-100 (with one acrylate group), 611A-85 (with two acrylate groups), 611B-85 (with two acrylate groups), 6112-100 (with two acrylate groups), 6113 (with two acrylate groups), 6114 (with two acrylate groups), 6115J-80 (with two acrylate groups), 6120E-80 (with two acrylate groups), 6121F-80 (with two acrylate groups), 6122F-80 (with two acrylate groups), 6130B-80 (with three acrylate groups), 6131-1 (with two acrylate groups), 6134B-80 (with three acrylate groups), 6141H-80 (with two acrylate groups), 6154B-80 (with two acrylate groups), 6155, 6156, 6157B-80 (with two acrylate groups), 6158B-80 (with an average of 3.8 acrylate groups), 6160B-70 (with two acrylate groups), 6160-100 (with six acrylate groups), 6175-1, 6181 (with two acrylate groups), 6196-100 (with fifteen acrylate groups), 6142H-80 (with two acrylate groups), 6143A-80 (with two acrylate groups), 6144-100 (with six acrylate groups), 6145-100 (with six acrylate groups), 6145-100H (with six acrylate groups), 6146-100 (with six acrylate groups), 6148J-75 (with two acrylate groups), 6148T-85 (with two acrylate groups), 6149-100 (with six acrylate groups), 615-100 (with two acrylate groups), 6150-100 (with six acrylate groups), 6151 (with two acrylate groups), 6152B-80 (with two acrylate groups), or 6153-1.

The urethane acrylate oligomer may include urethane acrylate oligomers manufactured by Double Bond Chemical Co., Ltd with trade Nos. 5212 (with two acrylate groups), 5220 (with two acrylate groups), 5230 (with two acrylate groups), 5300 (with two acrylate groups), 541 (with two acrylate groups), 5400 (with one acrylate group), 5500 (with two acrylate groups), 553 (with two acrylate groups), 564 (with three acrylate groups), 566 (with two acrylate groups), 570 (with two acrylate groups), 571 (with six acrylate groups), 583-1 (with three acrylate groups), 584 (with two acrylate groups), 585 (with four acrylate groups), 586 (with six acrylate groups), 588 (with ten acrylate groups), 594 (with three acrylate groups), 5812 (with twelve acrylate groups), 5900 (with two acrylate groups), 7200 (with two acrylate groups), 7201M (with two acrylate groups), 850 (with 5-8 acrylate groups), 87A (with six acrylate groups), 88A (with six acrylate groups), or 89A (with six acrylate groups).

According to an embodiment of the disclosure, the composition 115 may further include a photo initiator in order to enhance the curing efficiency of the composition and increase the cross-linking degree of obtained polymer during the curing process. The curing process may include irradiating the coating with an ultraviolet or visible radiation. The photo initiator may include 2-hydroxy-2-methylpropiophenone, ethyl 4-dimethylaminobenzoate, 2,2-Dimethoxy-2-phenylacetophenone, diphenyl (2,4,6-trimethylbenzoyl) phosphine, ethyl (2,4,6-trimethylbenzoyl) phenylphosphinat, morpholino-1-propanone(2-methyl-4'-(methylthio)-2-morpholinopropiophenone, phenyl bis(2,4,6-trimethylbenzoyl)-phosphine oxide, 4-chlorobenzophenone, 4-(4-methylphenylthio)benzophenone, benzophenone, 2-ethylhexyl 4-dimethylaminobenzoate, 2,4-diethyl-9H-thioxanthen-9-one, 1-hydroxycyclohexyl phenyl ketone, or a combination thereof.

According to an embodiment of the disclosure, the composition may further include a solvent in order to form an uniformly distributed composition. The solvent may include acetone, methyl ethyl ketone, methyl isobutyl ketone, ethanol, n-butyl acetate, toluene, propylene glycol monomethyl ether acetate, γ-butyrolactone, dimethylacetamide, N-methyl-2-pyrrolidone, or a combination thereof.

According to an embodiment of the disclosure, the composition may further include a nanoparticle in order to increase the abrasion resistance, hardness, corrosion resistance, thermal stability, chemical stability, deformation resistance, or refractive index. The nanoparticle may include silicon oxide, aluminum oxide, titanium oxide, zinc oxide, zirconium oxide, cerium oxide, tin oxide, or a combination thereof.

FIGS. 2A to 2D are cross sections illustrating the method for manufacturing the substrate structure according to an embodiment of the disclosure.

Figure 2A:
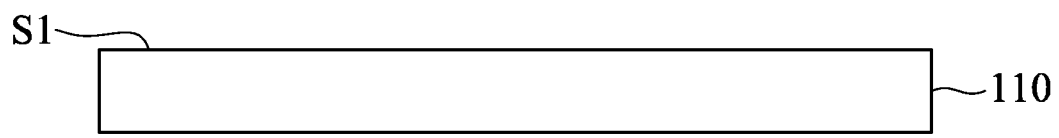
FIGS. 2A to 2D are cross sections illustrating the method for manufacturing the substrate structure according to an embodiment of the disclosure.
Figure 2B:
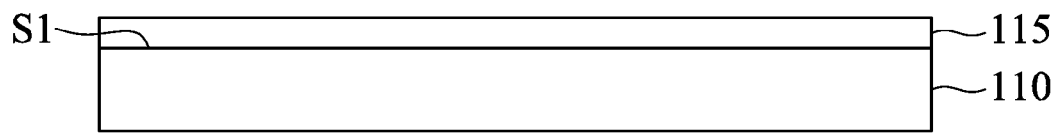

In the method for manufacturing a substrate structure shown in FIGS. 1A and 1B, a carrier 110 having a top surface S1 is provided, as shown in FIG. 2A. A composition 115 is coated on the top surface S1 of the carrier 110, as shown in FIG. 2B. The method for coating the composition 115 on the top surface S1 of the carrier 110 may include spin coating, screen printing, bar coating, immersion coating, dip coating, roll coating, slit coating, or blade coating. The composition 115 includes at least one acrylate monomer and at least one acrylate-based oligomer, wherein the total number of acrylate groups in the acrylate-based monomer and the acrylate-based oligomer is greater than or equal to 3.

Figure 2C:
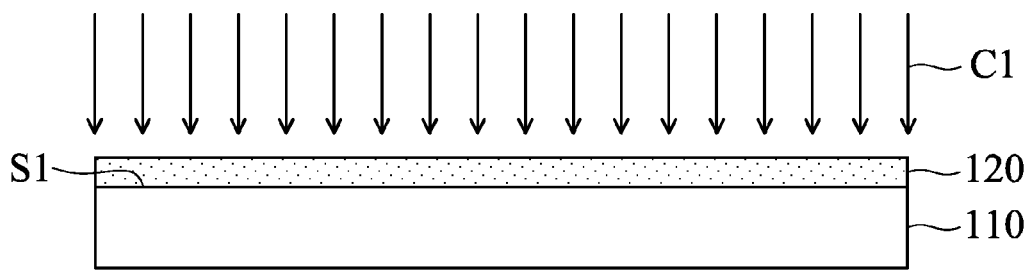

As shown in FIG. 2C, the coating of the composition 115 is subjected to a curing process C1 to form a de-bonding layer 120, wherein there is a first adhesion force between the de-bonding layer 120 and the carrier 110. The curing process C1 maybe a thermal curing process or photo-curing process, wherein the photo-curing process may include irradiating the coating of composition with an ultraviolet or visible radiation. In an embodiment, the composition 115 may include at least one acrylate monomer and at least one acrylate-based oligomer, wherein the total number of acrylate groups in the acrylate-based monomer and the acrylate-based oligomer is greater than or equal to 3. The obtained de-bonding layer 120 after curing process may have an abrasion resistance criterion according to DIN 58196-H25 or DIN 58196-G10. Therefore, the de-bonding layer 120 exhibits release characteristics and abrasion resistance. In addition, the de-bonding layer 120 may be further subjected to a thermal process after curing process or forming a flexible substrate 130 thereon, and the thermal process has a process temperature between 60-300° C. The thermal process may be performed under nitrogen atmosphere or vacuum in order to enhance the abrasion resistance of the de-bonding layer 120. Therefore, the de-bonding layer 120 may be formed without yellowing or embrittlement, resulting in enhancing the optical and mechanical properties.

Figure 2D:
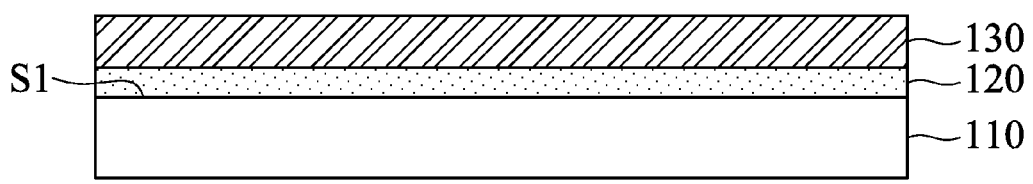

As shown in FIG. 2D, a flexible substrate 130 is formed to cover and contact to the de-bonding layer 120. There is a second adhesion force between the flexible substrate 130 and the de-bonding layer 120, wherein the second adhesion force greater than first adhesion force.

Figure 2E:
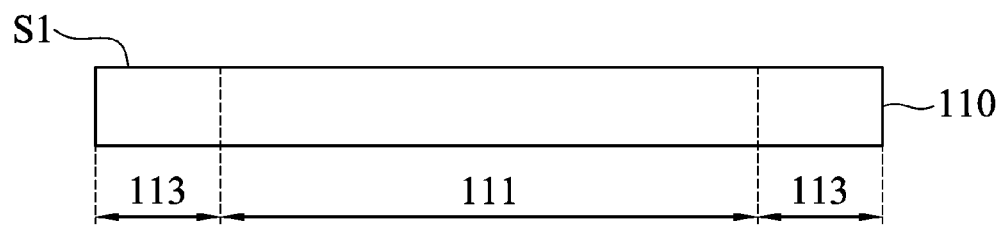
FIGS. 2E to 2H are cross sections illustrating the method for manufacturing the substrate structure according to an embodiment of the disclosure.
Figure 2F:
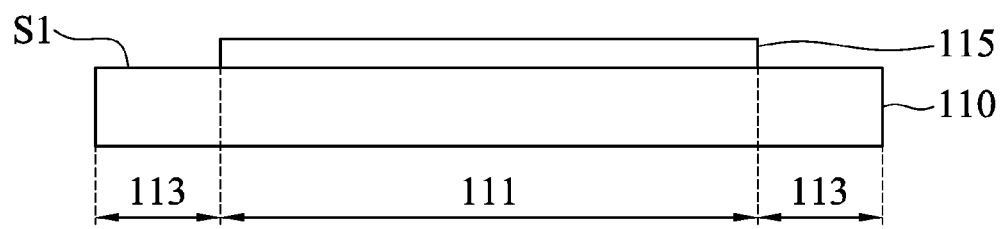

FIGS. 2E to 2H are cross sections illustrating the method for manufacturing the substrate structure according to an embodiment of the disclosure, such as the substrate structure as shown in FIGS. 1C and 1D. A carrier 110 with a top surface S1 is provided, wherein the top surface S1 has a first region 111 and a second region 113, as shown in FIG. 2E. A composition 115 is coated on the first region 111 of the top surface S1, as shown in FIG. 2F. The method for coating the composition 115 on the top surface S1 of the carrier 110 may include spin coating, screen printing, bar coating, immersion coating, dip coating, roll coating, slit coating, or blade coating. The composition 115 may include at least one acrylate monomer and at least one acrylate-based oligomer, wherein the total number of acrylate groups in the acrylate-based monomer and the acrylate-based oligomer is greater than or equal to 3.

Figure 2G:
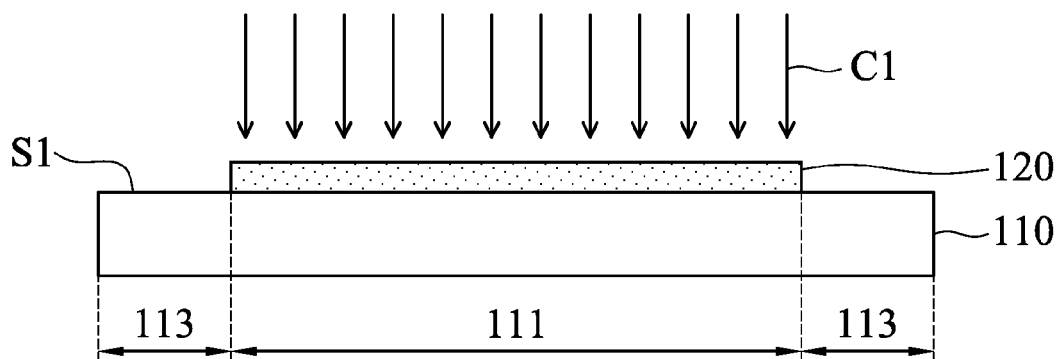

As shown in FIG. 2G, the coating of the composition 115 is subjected to a curing process C1 to form a de-bonding layer 120, wherein there is a first adhesion force between the de-bonding layer 120 and the carrier 110. The curing process C1 may be a thermal curing process or photo-curing process, wherein the photo-curing process may include irradiating the coating of composition with an ultraviolet or visible radiation.

In an embodiment, the composition 115 may include at least one acrylate monomer and at least one acrylate-based oligomer, wherein the total number of acrylate groups in the acrylate-based monomer and the acrylate-based oligomer is greater than or equal to 3. The obtained de-bonding layer 120 after curing process may have an abrasion resistance criterion according to DIN 58196-H25 or DIN 58196-G10. Therefore, the de-bonding layer 120 exhibits release characteristic and abrasion resistance. In addition, the de-bonding layer 120 may be further subjected to a thermal process after curing process or forming a flexible substrate 130 thereon, and the thermal process has a process temperature between 60-300° C. The thermal process may be performed under nitrogen atmosphere or vacuum (such as $10^{-4}$ Torr) in order to enhance the abrasion resistance of the de-bonding layer 120. Therefore, the de-bonding layer 120 may be formed without yellowing or embrittlement, resulting in enhancing the optical and mechanical properties.

Figure 2H:
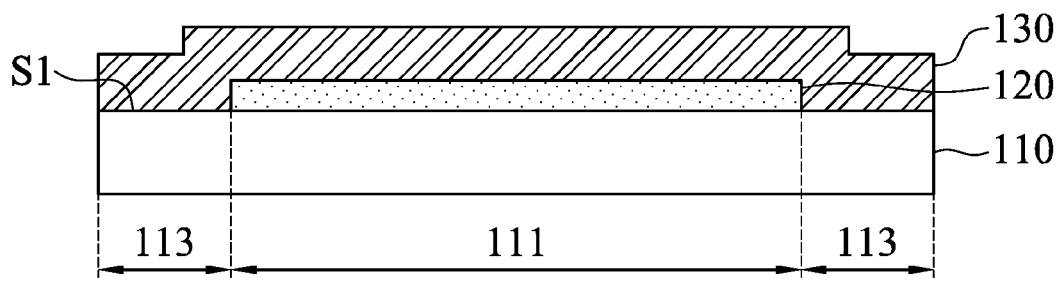

A flexible substrate 130 is formed to cover the de-bonding layer 120 and the second region 113 of the carrier 110, as shown in FIG. 2H. Furthermore, the flexible substrate 130 contacts to the de-bonding layer 120 and the carrier 110. There is a second adhesion force between the flexible substrate 130 and de-bonding layer 120, there is a third adhesion force between the flexible substrate 130 and the carrier 110, and the second adhesion force and the third adhesion force are greater than the first adhesion force.

Below, exemplary embodiments will be described in detail with reference to accompanying drawings so as to be easily realized by a person having ordinary knowledge in the art. The disclosure concept may be embodied in various forms without being limited to the exemplary embodiments set forth herein. Descriptions of well-known parts are omitted for clarity, and like reference numerals refer to like elements throughout.

[Example 1] Preparation of Composition 8 g of Doublemer 588 (aliphatic urethane acrylate oligomer having ten acrylate groups, manufactured by Double Bond Chemical Co., Ltd), 5 g of Doublemer 87A (aliphatic urethane hexa-acrylate oligomer, manufactured by Double Bond Chemical Co., Ltd), 11 g of trimethylol propane triacrylate, 13 g of MEK-ST (silica dissolved in methyl ethyl ketone, manufactured by Nissan Chemical Industries, Ltd), 0.24 g of 2-hydroxy-2-methylpropiophenone (photo initiator), 0.6 g of 1-hydroxy cyclohexyl phenyl ketone (photo initiator), and 0.2 g phenyl bis(2,4,6-trimethylbenzoyl)-phosphine oxide (photo initiator) were dissolved in 10.2 g of n-butyl acetate. After stirring, a composition for forming the de-bonding layer was obtained.

Figure 3A:
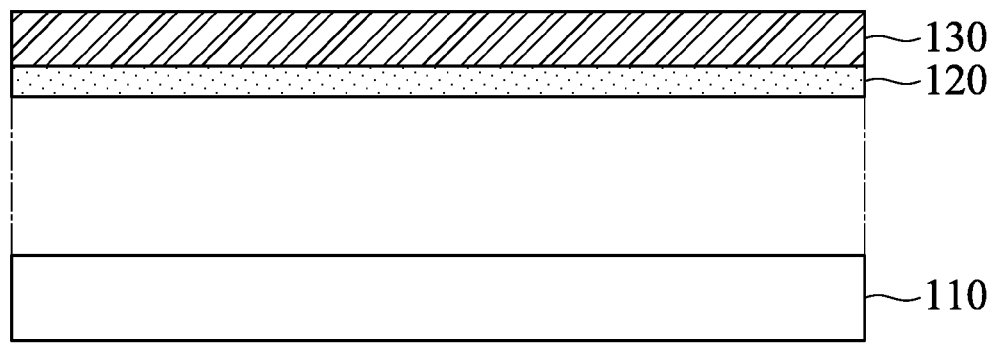
FIG. 3A shows a cross section of the substrate structure as shown in FIG. 2D after being subjected to a de-bonding process.

FIG. 3A shows a cross section of the substrate structure as shown in FIG. 2D after being subjected to a de-bonding process. There is a first adhesion force between the de-bonding layer 120 and the carrier 110, and there is a second adhesion force between the flexible substrate 130 and the de-bonding layer 120. Since the second adhesion force is greater than the first adhesion force, the de-bonding layer 120 may be isolated from the carrier 110, when performing a de-bonding process to separate the flexible substrate 130 from the carrier 110. Furthermore, due to the abrasion resistance and anti-scratch properties of the de-bonding layer 120, the de-bonding layer 120 may serve as a hard coating layer to prevent the flexible substrate 130 from being scratched.

Figure 3B:
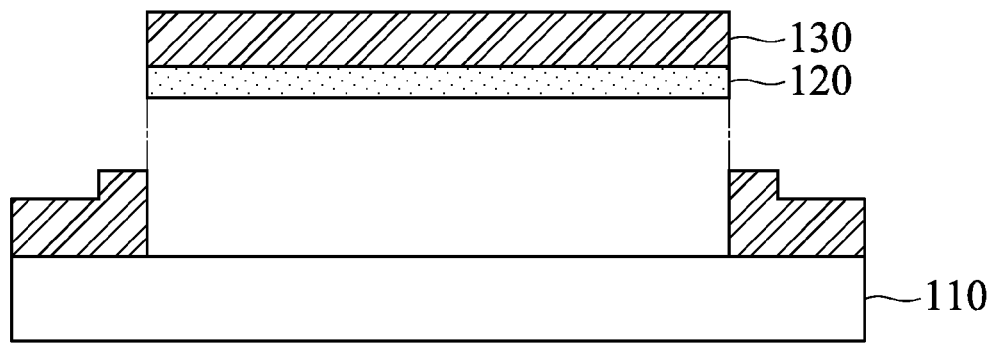
FIG. 3B shows a cross section of the substrate structure as shown in FIG. 2H after being subjected to a de-bonding process.

FIG. 3B shows a cross section of the substrate structure as shown in FIG. 2H after being subjected to a de-bonding process. There is a first adhesion force between the de-bonding layer 120 and the carrier 110, there is a second adhesion force between the flexible substrate 130 and the de-bonding layer 120, and there is a third adhesion force between the flexible substrate 130 and the carrier 110. Since the second adhesion force and the third adhesion force are greater than the first adhesion force, the de-bonding layer 120 may be isolated from the carrier 110, when performing a de-bonding process (such as cutting or laser ablation) to separate the flexible substrate 130 from the carrier 110.

Furthermore, due to the abrasion resistance and anti-scratch properties of the de-bonding layer 120, the de-bonding layer 120 may serve as a hard coating layer to prevent the flexible substrate 130 from being scratched.

Since the obtained flexible substrate 130 may exhibit an impact resistance and abrasion resistance, there is no need to further form other hard coating layers on the obtained flexible substrate 130. The process for manufacturing a flexible substrate 130 with high impact resistance and abrasion resistance may be simplified, and the thickness of the flexible substrate may be reduced on the premise of having mechanical strength and superior optical properties.

FIGS. 4A to 4E are cross sections showing the formation of additional layers on the substrate structure as shown in FIG. 2H. Furthermore, the additional layers may be formed on the substrate structure as shown in FIG. 2D.

Figure 4A:
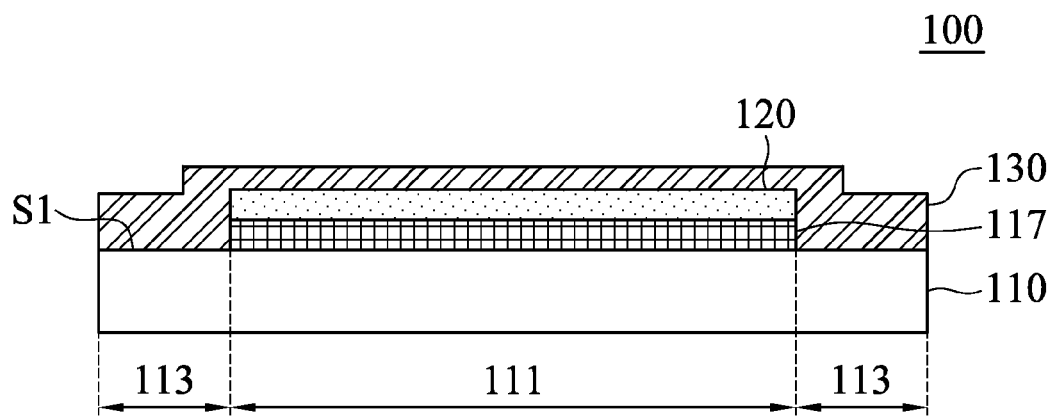
FIGS. 4A to 4E show cross sections of substrate structures according to some embodiments of the disclosure.

In another embodiment of the disclosure, as shown in FIG. 4A, the substrate structure 100 may further include a first functional layer 117 disposed between the carrier 110 and the de-bonding layer 120. Further, the first functional layer 117 may be disposed between the de-bonding layer 120 and the flexible substrate 130. The first functional layer 117 may be a single layer or a multilayer structure, and may include a metal, organic material, inorganic material, organic-inorganic hybrid material, or a stack of organic and inorganic materials. The first functional layer 117 may be a continuous layer or a patterned layer. For example, the first functional layer 117 may be a patterned layer serving as an alignment mark and disposed on a peripheral region. There may be a fourth adhesion force between the first functional layer 117 and the carrier 110, there may be a fifth adhesion force between the de-bonding layer 120 and the first functional layer 117, and the fifth adhesion force is greater than the fourth adhesion force when the first functional layer 117 is disposed between the carrier 110 and the de-bonding layer 120. Furthermore, there may be a first adhesion force between the de-bonding layer 120 and the carrier 110, there may be a fifth adhesion force between the de-bonding layer 120 and the first functional layer 117, and the fifth adhesion force is greater than the first adhesion force when the first functional layer 117 is disposed between the flexible substrate 130 and the de-bonding layer 120.

Figure 4B:
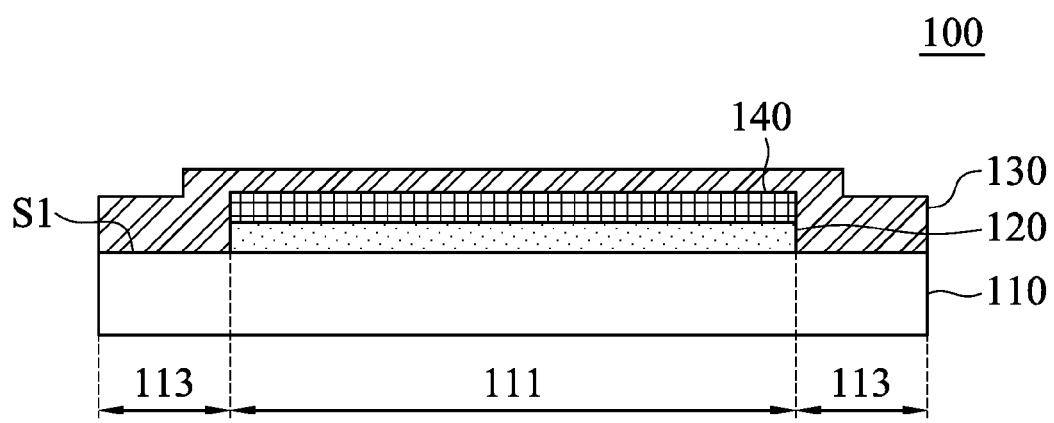

In another embodiment of the disclosure, as shown in FIG. 4B, the substrate structure 100 may further include a second functional layer 140 disposed between the de-bonding layer 120 and the flexible substrate 130. In other embodiments of the disclosure, when the first functional layer 117 is disposed between the de-bonding layer 120 and the flexible substrate 130, the second functional layer 140 may be disposed between the carrier 110 and the de-bonding layer 120. Further, the substrate structure 100 may include the first functional layer 117 disposed between the carrier 110 and the de-bonding layer 120, and the second functional layer 140 disposed between the de-bonding layer 120 and the flexible substrate 130. The second functional layer 140 may be a single layer or a multilayer structure, and may include a metal, organic material, inorganic material, organic-inorganic hybrid material, or a stack of organic and inorganic materials. For example, the second functional layer 140 may be an adhesive layer in order to enhance the adhesion between the de-bonding layer 120 and the flexible substrate 130, thereby preventing the de-bonding layer 120 from separating from the flexible substrate 130. In addition, the second functional layer 140 may be a hydrophobic layer, gas barrier layer, stress compensation layer, stress buffer layer, color filter layer, polarizing layer, or surface treatment layer.

Figure 4C:
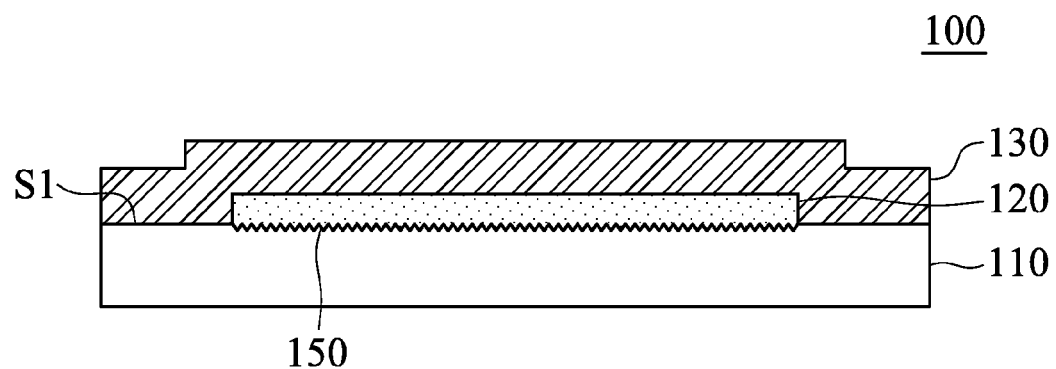
Figure 4D:
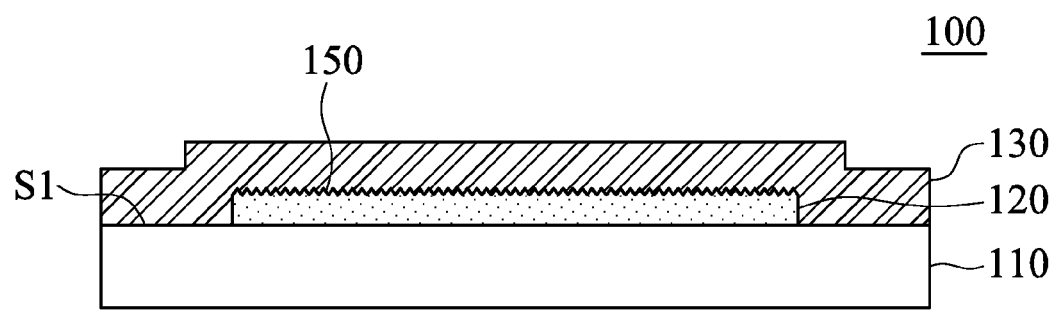

In some embodiments of the disclosure, as shown in FIG. 4C, the bottom surface, which contacts to the carrier 110, of the de-bonding layer 120 may further have an optical micro-structure 150, forcing the flexible substrate 130 to have antireflective properties, for example. In an embodiment of the disclosure, an optical micro-structure 150 may be formed on the top surface S1 of the carrier 110, and then a composition 115 may be coated on the top surface S1 of the carrier 110. After curing, a de-bonding layer 120 having an optical micro-structure 150 formed on the bottom surface thereof may be obtained. In addition, an optical micro-structure 150 may be also formed on the top surface of the de-bonding layer 120, wherein the optical micro-structure 150 contacts to the flexible substrate 130, as shown in FIG. 4D.

Figure 4E:
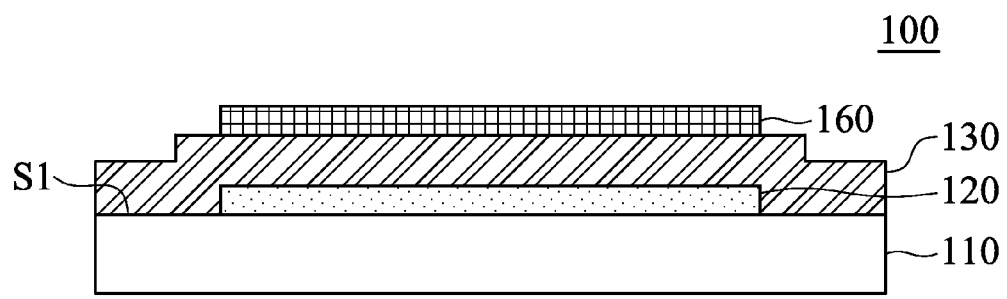

In some embodiments of the disclosure, as shown in FIG. 4E, the substrate structure 100 may further include a third functional layer 160, which is partially or completely disposed on the flexible substrate 130. The third functional layer 160 may be a protective layer, planarization layer, gas barrier layer, stress compensation layer, or stress buffer layer. When the third functional layer 160 is a protective layer, the third functional layer 160 may prevent the flexible substrate 130 from deterioration by the substance which affects the characteristics of the flexible substrate 130. When the third functional layer 160 is a planarization layer, the planarized surface of the third functional layer 160 may facilitate manufacturing an electronic device employing the substrate structure 100.

The substrate structure according to embodiments of the disclosure may be applied in the manufacture of various electronic devices, such as display panel or touch panel.

Figure 5A:
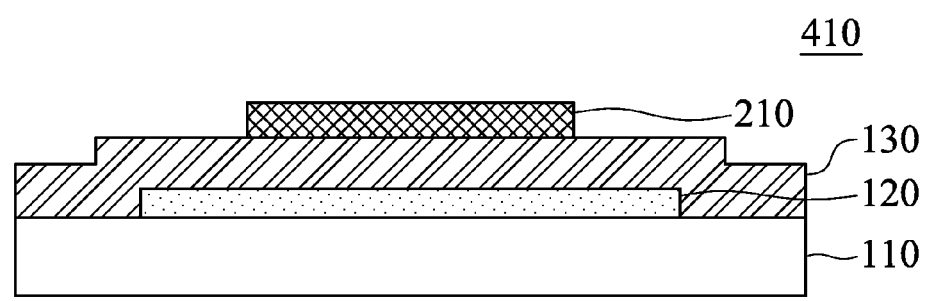
FIGS. 5A to 5H are cross sections illustrating the method for manufacturing the electronic device according to an embodiment of the disclosure.
Figure 5B:
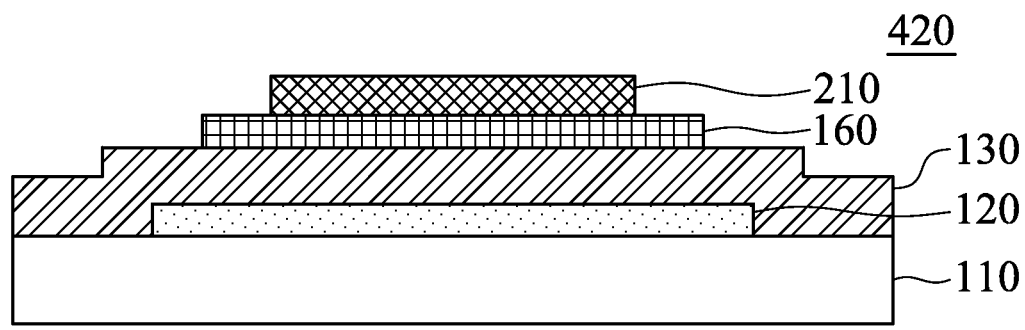
Figure 5C:
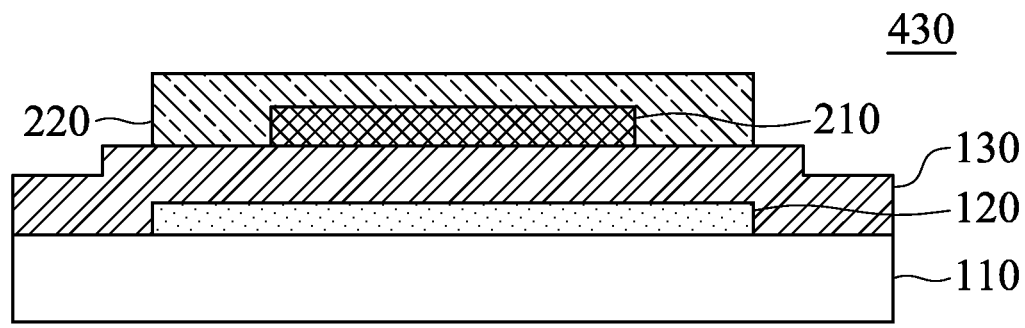
Figure 5D:
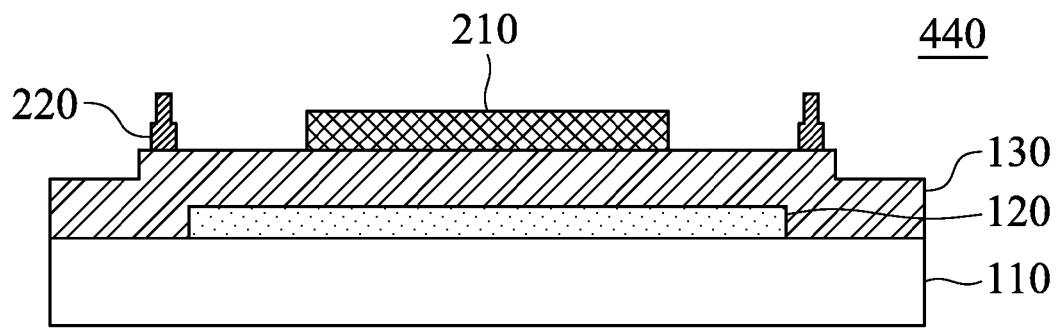

FIGS. 5A to 5H are cross sections illustrating the method for manufacturing the electronic device according to an embodiment of the disclosure. FIGS. 6A and 6B show top views of electronic devices having a gas barrier according to some embodiments of the disclosure.

According to an embodiment of the disclosure, methods for manufacturing aforementioned substrate structures are provided. At least one first electronic element 210 may be further formed on the substrate structure 100 as shown in FIG. 1C, as shown in FIG. 5A, wherein the first electronic element 210 may be a touch sensing element, display element, or a combination thereof. Furthermore, a third functional layer 160 may be disposed between the first electronic element 210 and the flexible substrate 130, as shown in FIG. 5B.

An electronic element may be formed between the flexible substrate 130 and the de-bonding layer 120 (not shown). As shown in FIG. 5C, according to an embodiment of the disclosure, a first gas barrier 220 may be formed on the first electronic element 210. In addition, the first gas barrier 220 may be formed to surround the first electronic element 210, as shown in FIG. 5D.

Figure 5E:
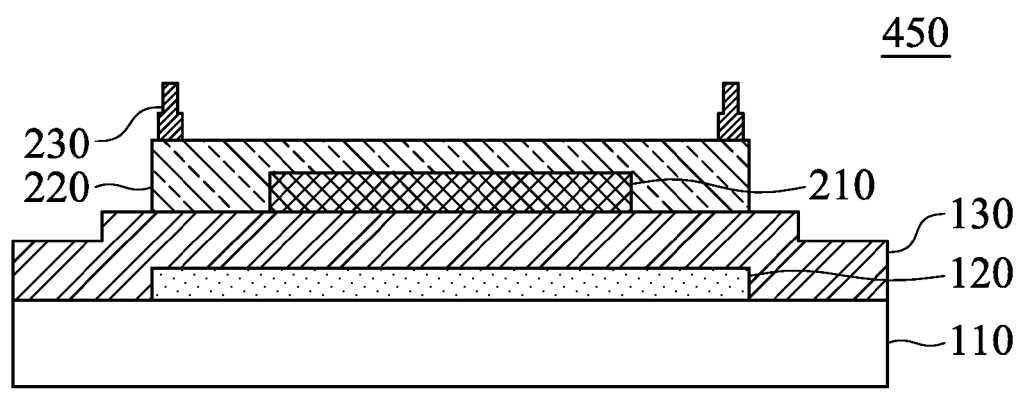
Figure 6A:
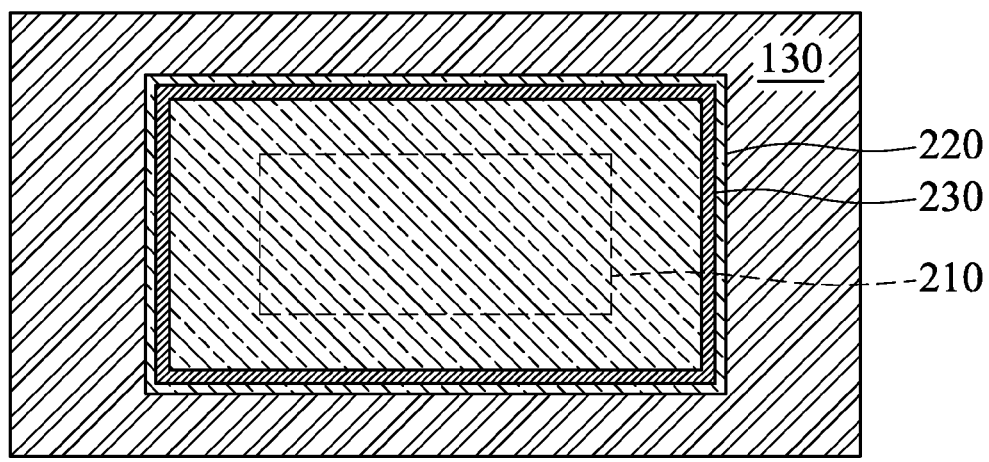
FIGS. 6A and 6B show top views of electronic devices having a gas barrier according to some embodiments of the disclosure.
Figure 6B:
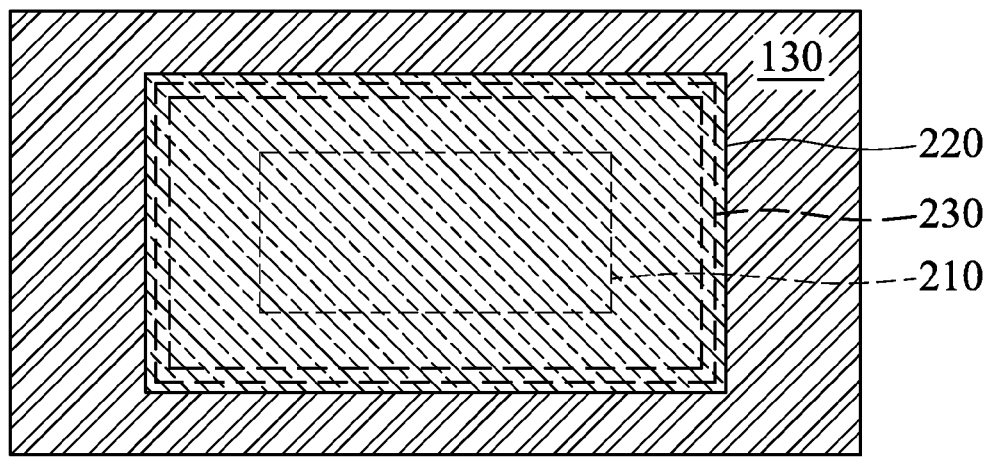

According to another embodiment of the disclosure, as shown in FIG. 5E, a second gas barrier 230 may be formed on the first gas barrier 220 to surround the first electronic element 210. The first gas barrier 220 and the second gas barrier 230 may include an organic layer, inorganic layer, organic/inorganic hybrid layer, or a stack of organic and inorganic layer. Due to the first gas barrier 220 and the second gas barrier 230, the water vapor transmission rate (WVTR) of the electronic device may be less than or equal to $10^{-1}$ g/m$^2$/day. Therefore, the first gas barrier 220 and the second gas barrier 230 may prevent the electronic device from deterioration due to moisture or oxygen.

Figure 5F:
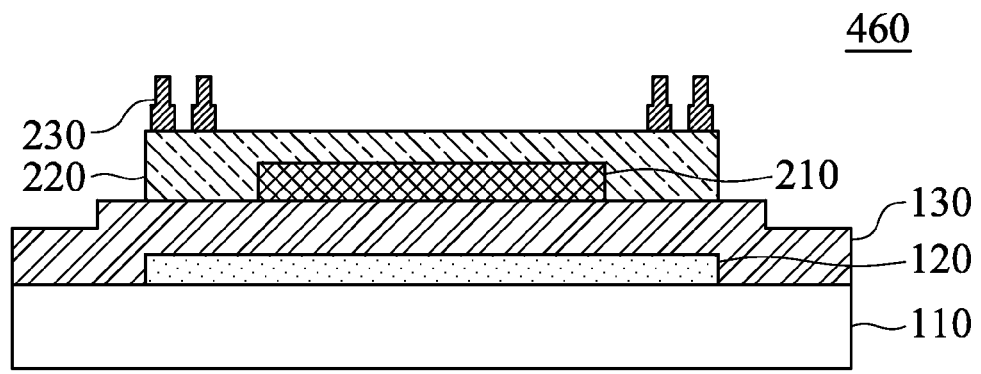

According to other embodiments of the disclosure, the second gas barrier 230 surrounding the first electronic element 210 may be constituted by multi-loops, as shown in FIG. 5F. FIG. 6A shows a top view of the electronic device as shown in FIG. 5E. As shown in FIG. 6A, the second gas barrier 230 may be a continuous and closed loop. In addition, according to another embodiment of the disclosure, the second gas barrier 230 may be non-continuous segments, as shown in FIG. 6B.

Figure 5G:
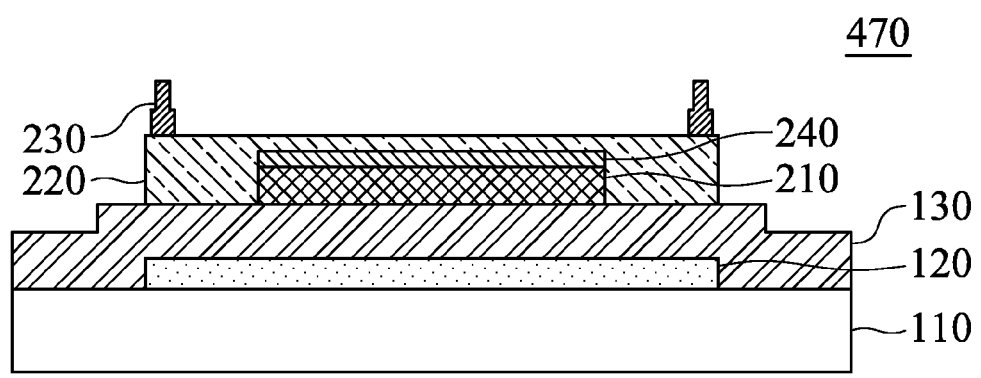

According to another embodiment of the disclosure, as shown in FIG. 5G, a fourth functional layer 240 may be formed on the first electronic element 210. The fourth functional layer 240 may be a planarization layer, stress compensation layer, stress buffer layer, or protective layer. In FIG. 5G, the first gas barrier 220 may be, but not limited to being, formed after the formation of the fourth functional layer 240. Namely, in another embodiment of the disclosure, the first gas barrier 220 may be formed before the formation of the fourth functional layer 240. The first gas barrier 220 may be disposed between the first electronic element 210 and the fourth functional layer 240. In an embodiment, the fourth functional layer 240 may protect the first electronic element 210 and provide a planar surface for the first electronic element 210.

Figure 5H:
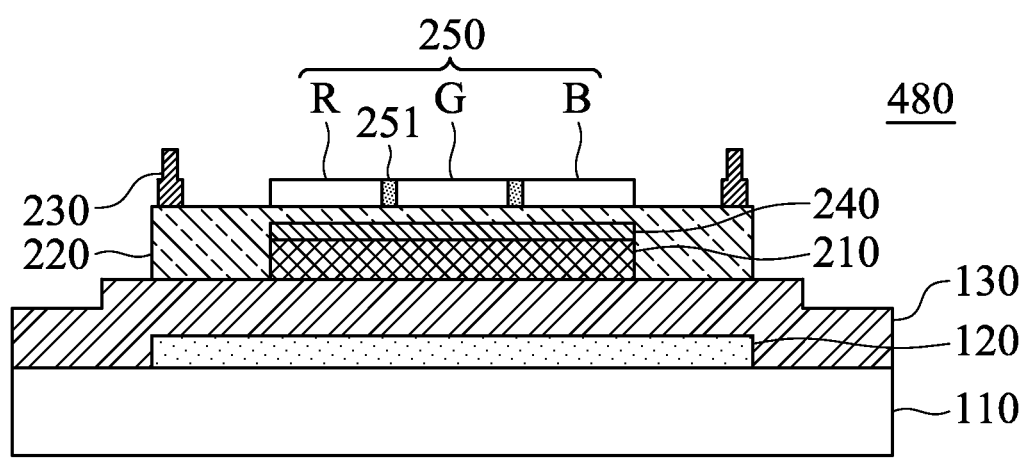

According to other embodiments of the disclosure, a fifth functional layer 250 may be disposed on the first electronic element 210, as shown in FIG. 5H. The fifth functional layer 250 may be adhesive layer, stress compensation layer, stress buffer layer, polarizing layer, or color filter element. For example, the fifth functional layer 250 may be a color filter element, forcing the first electronic element 210 (such as a display element) achieving full-color display. The fifth functional layer 250 may include a red filter layer R, blue filter layer B, and green filter layer G, optionally separated from each other by black matrix 251. In an embodiment, the first gas barrier 220 or the second gas bather 230 may include at least one organic layer and at least one inorganic layer stacked on each other, wherein at least one of the organic layers has the same material as the red filter layer R, blue filter layer B, green filter layer G, and/or black matrix 251. Namely, the organic layer of the first gas barrier 220 (or the second gas barrier 230) and the fifth functional layer 250 may be formed by the same process and the same material.

The electronic devices 410, 420, 430, 440, 450, 460, 470, and 480 respectively corresponding to FIGS. 5A-5H are fabricated.

FIGS. 7A to 7F show cross sections of electronic devices according to some embodiments of the disclosure. Descriptions of parts of FIGS. 5A-5H and FIGS. 6A-6B are omitted for clarity, and like reference numerals refer to like elements throughout.

Figure 7A:
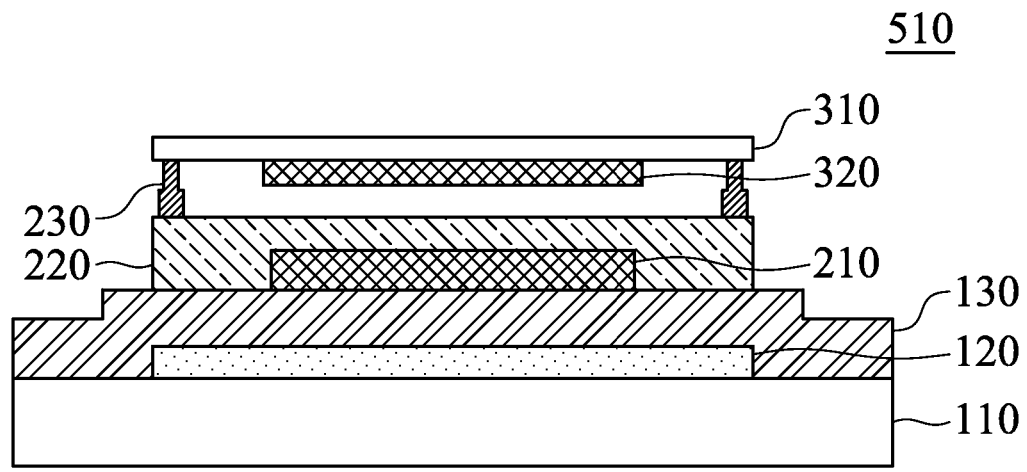
FIGS. 7A to 7F show cross sections of electronic devices according to some embodiments of the disclosure.
Figure 7B:
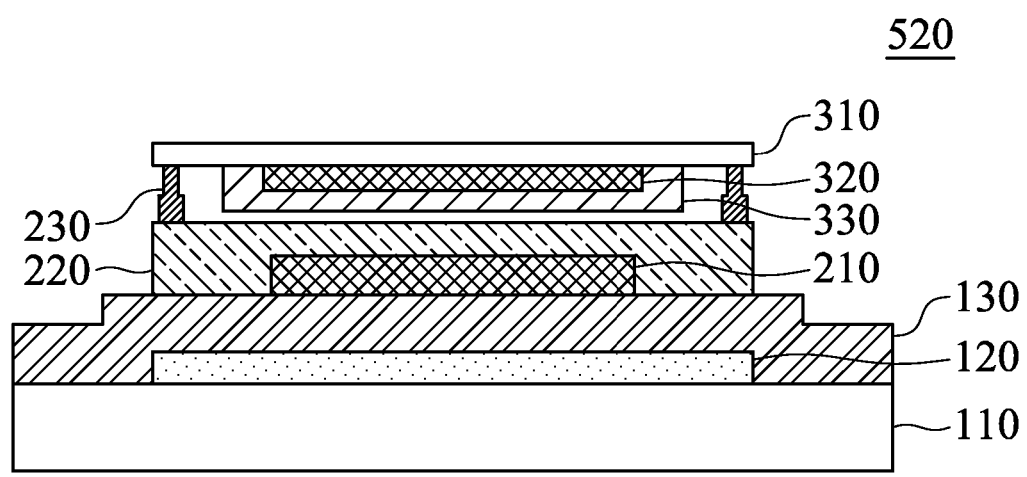
Figure 7C:
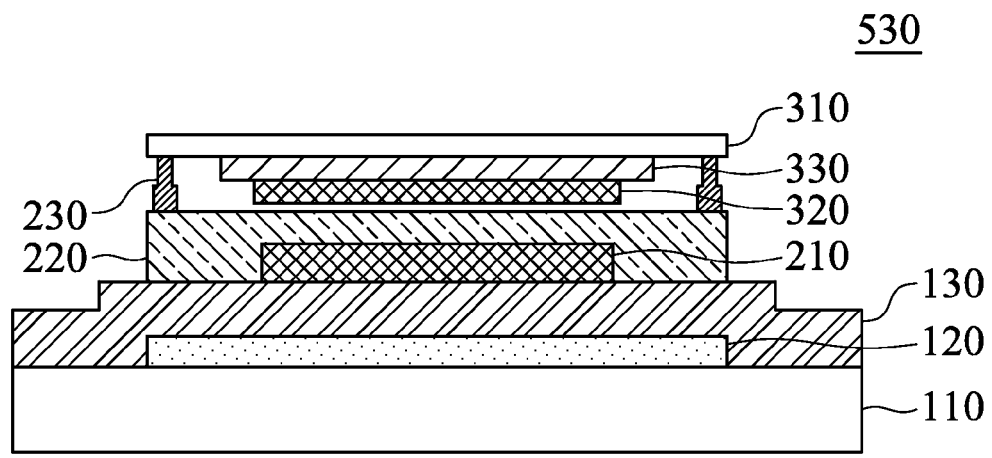
Figure 7D:
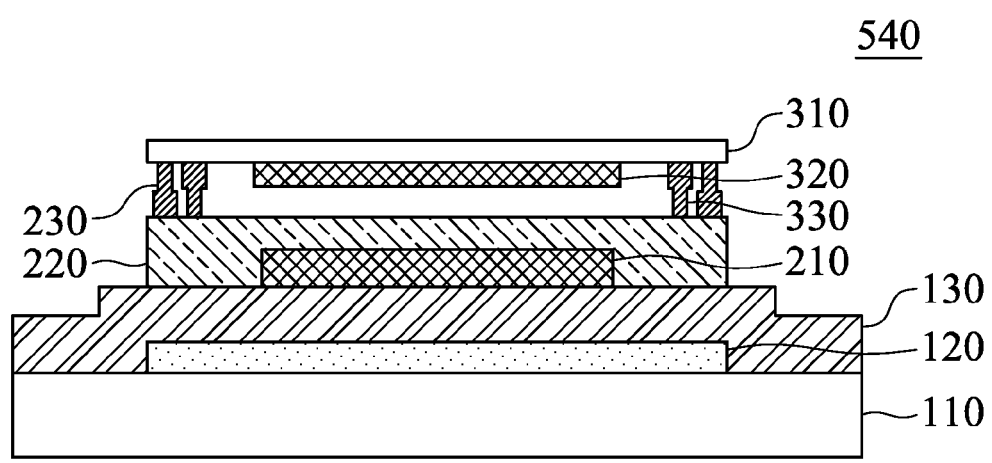
Figure 7E:
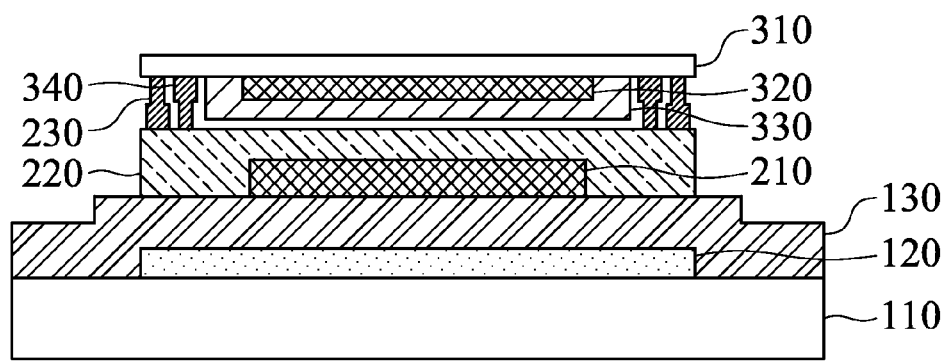

As shown in FIG. 7A, a substrate 310 may be formed on the structure as shown in FIG. 5E. Furthermore, the substrate 310 may be also formed on the structures as shown in FIGS. 5A to 5D and FIGS. 5F to 5H. The substrate 310 may be formed on the structure as shown in FIG. 5E by means of a transparent adhesive agent, or an opaque adhesive agent. A second electronic element 320 may be disposed on the bottom surface of the substrate 310, and the second electronic element 320 may be disposed to face the first electronic element 210, as shown in FIG. 7A. The second electronic element 320 may include a touch sensing element, display element, or a combination thereof. In another embodiment of the disclosure, the third gas barrier 330 may be disposed on the bottom surface of the substrate 310 to cover the second electronic element 320, as shown in FIG. 7B. According to other embodiments of the disclosure, the second electronic element 320 may be disposed on the bottom surface of the third gas barrier 330, as shown in FIG. 7C. In addition, the third gas barrier 330 may be formed to surround the second electronic element 320, as shown in FIG. 7D. In some embodiments of the disclosure, at least one fourth gas barrier 340 may be disposed on the bottom surface of the substrate 310 and surround the second electronic element 320, as shown in FIG. 7E. In an embodiment, the second electronic element 320 may be disposed between the third gas barrier 330 and the fourth gas barrier 340. The third gas barrier 330 and the fourth gas barrier 340 may include an organic layer, inorganic layer, organic/inorganic hybrid layer, or a stack of organic and inorganic layer. Due to the third gas barrier 330 and the fourth gas barrier 340, the water vapor transmission rate (WVTR) of the electronic device may be less than or equal to $10^{-1}$ g/m$^2$/day. Therefore, the third gas barrier 330 and the fourth gas barrier 340 may prevent the electronic device from deterioration due to moisture or oxygen.

In an embodiment, the third gas barrier 330 or the fourth gas barrier 340 may be a continuous and closed loop or non-continuous segments surrounding the second electronic element 320. In addition, according to another embodiment of the disclosure, the second gas barrier 230 may contact to the fourth gas bather 340.

According to an embodiment of the disclosure, a vertical section on the flexible substrate 130 of the first gas barrier 220, second gas barrier 230, third gas barrier 330, and fourth gas barrier 340 may be, but not limited to being, triangular, rectangular, trapezoidal, polygonal or bullet-shaped.

Figure 7F:
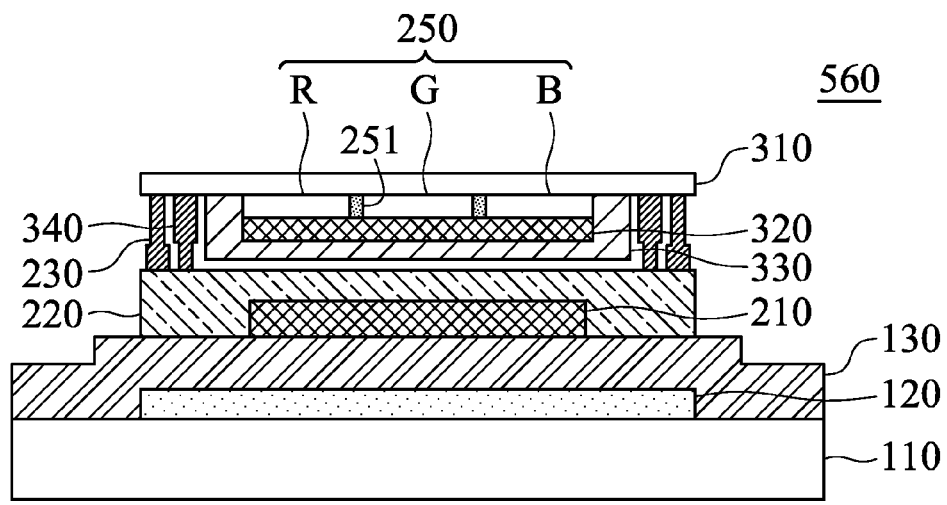

According to other embodiments of the disclosure, as shown in FIG. 7F, the fifth functional layer 250 may be a color filter element and disposed on the second electronic element 320, forcing the second electronic element 320 (such as a display element) achieving full-color display. The fifth functional layer 250 may include a red filter layer R, blue filter layer B, and green filter layer G, optionally separated by each other by black matrix 251.

In an embodiment, the third gas barrier 330 or fourth gas barrier 340 may include at least one organic layer and at least one inorganic layer stacked each other, wherein at least one of the organic layer has a same material of the red filter layer R, blue filter layer B, green filter layer G, and/or black matrix 251. Namely, the organic layer of third gas barrier 330 (or the fourth gas barrier 340) and the fifth functional layer 250 may be formed by the same process and the same material.

The electronic devices 510, 520, 530, 540, 550, and 560 respectively corresponding to FIGS. 7A-7F are fabricated.

Figure 8:
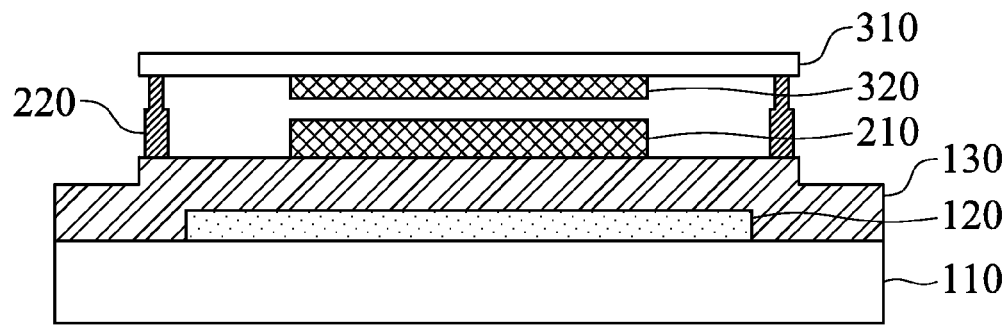
FIGS. 8 and 9 show cross sections of electronic devices according to some embodiments of the disclosure.
Figure 9:
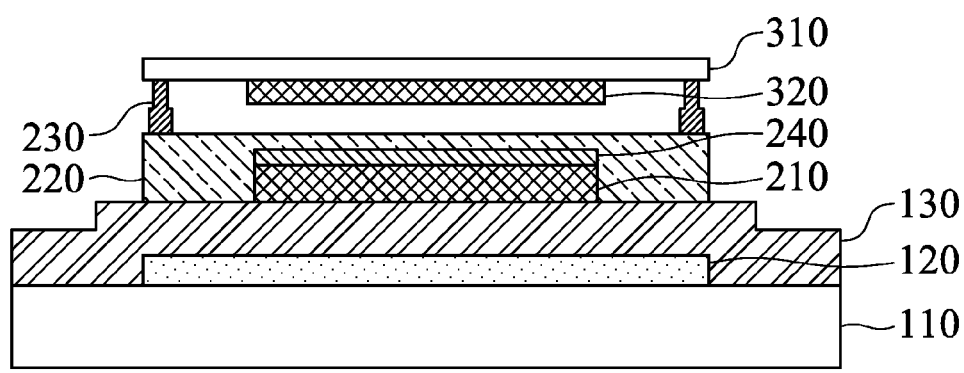

In some embodiments of the disclosure, substrate 310 may be disposed on the structures as shown in FIGS. 5D and 5G, as shown in FIGS. 8 and 9. The substrate 310 may be laminated on the structures as shown in FIGS. 5D and 5G by means of a transparent adhesive agent, or opaque adhesive agent to form the electronic device 610 and 620, as shown in FIGS. 8 and 9.

Figure 10:
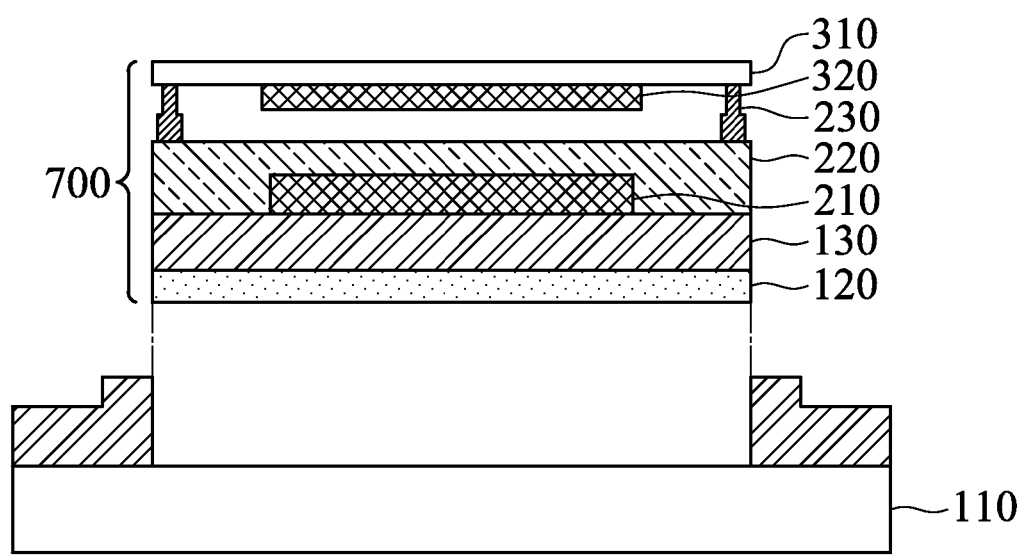
FIG. 10 shows a cross section of the electronic device as shown in FIG. 7A after being subjected to a de-bonding process.

FIG. 10 shows a cross section of the electronic device as shown in FIG. 7A after being subjected to a de-bonding process. Furthermore, the electronic devices as shown in FIGS. 5A to 5H and FIGS. 7B to 7F may be also subjected to a de-bonding process. There is a first adhesion force between the de-bonding layer 120 and the carrier 110, there is a second adhesion force between the flexible substrate 130 and the de-bonding layer 120, and there is a third adhesion force between the flexible substrate 130 and the carrier 110.

Since the second adhesion force and the third adhesion force are greater than the first adhesion force, the de-bonding layer 120 may be isolated from the carrier 110, when performing a de-bonding process (such as cutting or laser ablation) to separate the electronic device 700 from the carrier 110. Furthermore, due to the abrasion resistance and anti-scratch properties of the de-bonding layer 120, the de-bonding layer 120 may serve as a hard coating layer to prevent the electronic device 700 from being scratched. The process for manufacturing the electronic device 700 may be simplified on the promise of having mechanical strength and superior optical properties.

According to an embodiment of the disclosure, the de-bonding layer of the substrate structure exhibits release characteristic, anti-scratch properties and abrasion resistance. After separating the de-bonding layer and the flexible substrate from the carrier via a de-bonding process, the flexible substrate (with the de-bonding layer formed on the one surface thereof) exhibits an impact resistance and abrasion resistance. Therefore, there is no need to further form other hard coating layers on the flexible substrate. The process for manufacturing the flexible substrate with high impact resistance and abrasion resistance may be simplified. Furthermore, the thickness of the flexible substrate may be reduced on the promise of having mechanical strength and superior optical properties.

According to some embodiments of the disclosure, electronic devices employing the aforementioned substrate structure are provided. Since the de-bonding layer of the substrate structure exhibits release characteristic, anti-scratch properties and abrasion resistance, the electronic device exhibits an impact resistance and abrasion resistance after separating the electronic device from the carrier via a de-bonding process. Therefore, there is no need to further form other hard coating layers on the flexible substrate of the electronic device. The process for manufacturing the electronic device with high impact resistance and abrasion resistance may be simplified on the promise of having mechanical strength and superior optical properties.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A substrate structure, comprising:
   a carrier having a top surface;
   a de-bonding layer disposed on the top surface and in contact with the carrier, wherein there is a first adhesion force between the de-bonding layer and the carrier, the de-bonding layer is prepared from a composition, and the composition comprises:
   at least one acrylate monomer; and
   at least one acrylate-based oligomer, wherein the total number of acrylate groups in the acrylate-based monomer and the acrylate-based oligomer is greater than or equal to 3; and
   a flexible substrate disposed on and contacted the de-bonding layer, wherein there is a second adhesion force between the de-bonding layer and the flexible substrate, and the second adhesion force is greater than the first adhesion force.

2. The substrate structure as claimed in claim 1, wherein the acrylate monomer comprises methyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl acrylate, lauryl methacrylate, isooctyl acrylate, stearyl acrylate, isodecyl acrylate, stearyl methacrylate, isobornyl acrylate, isobornyl methacrylate, benzyl acrylate, phenoxy ethyl acrylate, ethoxylatedphenoxy ethyl acrylate, rimethyl cyclohexane acrylate, 2-(2-Ethoxyethoxy)ethyl acrylate, hydroxyethyl acrylate, 2-hydroxyethyl methacrylate, dioxane glycol diacrylate, hydroxypivalylhydroxypivalatediacrylate, 1,6-hexanediol diacrylate, ethoxylated 1,6-hexanediol diacrylate, dipropylene glycol diacrylate, tripropylene glycol diacrylate, tricyclodecanedimethanoldiacrylate, polyethylene glycol diacrylate, polyethylene glycol dimethacrylate, 2-hydroxyethyl methacrylate phosphate, neopentyl glycol diacrylate, propoxylatedneopentyl glycol diacrylate, ethoxylatedbisphenol-A diacrylate, ethoxylatedbisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, triethylene glycol dimethacrylate, diethylene glycol dimethacrylate, 1,4-butanediol diacrylate, 1,6-hexanediol dimethacrylate, allylatedcyclohexyldimethacrylate, tris(2-hydroxy ethyl) isocyanuratetriacrylate, pentaerythritoltriacrylate, ethoxylatedtrimethylolpropanetriacrylate, ethoxylatedtrimethylolpropanetrimethacrylate, propoxylatedtrimethylolpropanetriacrylate, trimethylolpropanetrimethacrylate, trimethylolpropanetriacrylate, pentaerythritoltriacrylate, ethoxylatedpentaerythritoltriacrylate, propoxylated glycerol triacrylate, propoxylatedpentaerythritoltriacrylate, pentaerythritoltetraacrylate, ethoxylatedpentaerythritoltetraacrylate, propoxylatedpentaerythritoltetraacrylate, trimethylolpropanetetracrylate, dipentaerythritolhexaacrylate, or a combination thereof.

3. The substrate structure as claimed in claim 1, wherein the acrylate-based oligomer comprises polyester acrylate oligomer, epoxy acrylate oligomer, urethane acrylate oligomer, or a combination thereof.

4. The substrate structure as claimed in claim 1, wherein the composition further comprising:
   a photo initiator, wherein the photo initiator comprises 2-hydroxy-2-methylpropiophenone, ethyl 4-dimethylaminobenzoate, 2,2-Dimethoxy-2-phenylacetophenone, diphenyl (2,4,6-trimethylbenzoyl) phosphine, ethyl (2,4,6-trimethylbenzoyl) phenylphosphinat, morpholino-1-propanone(2-methyl-4'-(methylthio)-2-morpholinopropiophenone, phenyl bis(2,4,6-trimethylbenzoyl)-phosphine oxide, 4-chlorobenzophenone, 4-(4-methylphenylthio)benzophenone, benzophenone, 2-ethylhexyl 4-dimethylaminobenzoate, 2,4-diethyl-9H-thioxanthen-9-one, 1-hydroxycyclohexyl phenyl ketone, or a combination thereof.

5. The substrate structure as claimed in claim 1, wherein the composition further comprising:
   a nanoparticle, wherein the nanoparticle comprises silicon oxide, aluminum oxide, titanium oxide, zinc oxide, zirconium oxide, cerium oxide, tin oxide, or a combination thereof.

6. The substrate structure as claimed in claim 1, wherein the top surface of the carrier has a first region and a second region, wherein the de-bonding layer is disposed within the first region, the flexible substrate covers and contacts the second region of the top surface, and wherein there is a third adhesion force between the flexible substrate and the carrier, and the third adhesion force is greater than the first adhesion force.

7. The substrate structure as claimed in claim 1, further comprising:
   a first functional layer disposed between the de-bonding layer and the carrier.

8. The substrate structure as claimed in claim 1, further comprising:

a second functional layer disposed between the de-bonding layer and the flexible substrate.

9. The substrate structure as claimed in claim 1, further comprising:
a third functional layer disposed on the flexible substrate.

10. The substrate structure as claimed in claim 1, further comprising:
a first electronic element disposed on the flexible substrate.

11. The substrate structure as claimed in claim 10, further comprising:
a first gas barrier disposed on the first electronic element or surrounding the first electronic element.

12. The substrate structure as claimed in claim 11, further comprising a second gas barrier surrounding the first electronic element.

13. The substrate structure as claimed in claim 10, further comprising a fourth functional layer disposed on the flexible substrate.

14. The substrate structure as claimed in claim 13, further comprising a first gas barrier disposed on the fourth functional layer or between the first electronic element and the fourth functional layer.

15. The substrate structure as claimed in claim 14, further comprising a second gas barrier surrounding the first electronic element.

16. The substrate structure as claimed in claim 10, further comprising a substrate disposed on the first electronic element.

17. The substrate structure as claimed in claim 16, further comprising a second electronic element disposed on the substrate, wherein the second electronic element is disposed on a surface of the substrate facing the first electronic element.

18. The substrate structure as claimed in claim 17, further comprising a third gas barrier disposed on the substrate, wherein the third gas barrier is disposed on the second electronic element or surrounding the second electronic element.

19. The substrate structure as claimed in claim 18, further comprising a fourth gas barrier disposed on the substrate and surrounding the second electronic element.

20. The substrate structure as claimed in claim 1, wherein the acrylate-based oligomer has a molecular weight between 500-200000 g/mol.

21. The substrate structure as claimed in claim 1, wherein the acrylate monomer has a molecular weight between 100-1000 g/mol.

22. An electronic device, comprising:
a flexible substrate having a top surface and a bottom surface;
a first electronic element disposed on the top surface of the flexible substrate; and
a de-bonding layer disposed on and contacted the bottom surface, wherein the de-bonding layer is prepared from a composition, and the composition comprises:
at least one acrylate monomer; and
at least one acrylate-based oligomer, wherein the total number of the acrylate groups in the acrylate-based monomer and the acrylate-based oligomer is greater than or equal to 3, wherein the acrylate-based oligomer comprises polyester acrylate oligomer, epoxy acrylate oligomer, urethane acrylate oligomer, or a combination thereof, and the acrylate-based oligomer has a molecular weight between 500-200000 g/mol.

* * * * *